United States Patent
Hurabielle et al.

(10) Patent No.: US 11,483,173 B2
(45) Date of Patent: Oct. 25, 2022

(54) SMART ADAPTATION OF THE FUNCTIONALITIES OF A REMOTE CONTROL IN A LOCAL AREA NETWORK

(71) Applicant: NETATMO, Boulogne Billancourt (FR)

(72) Inventors: Adèle Hurabielle, Saint-Cloud (FR); Marie Debard, Boulogne-Billancourt (FR); Alex Jilbert, Issy-les-Moulineaux (FR); Florent Matignon, Paris (FR); Romain Paoli, Meudon (FR)

(73) Assignee: NETATMO, Boulogne Billancourt (FR)

( * ) Notice: Subject to any disclaimer, the term of this patent is extended or adjusted under 35 U.S.C. 154(b) by 0 days.

(21) Appl. No.: 17/281,759

(22) PCT Filed: Sep. 30, 2019

(86) PCT No.: PCT/EP2019/076457
§ 371 (c)(1),
(2) Date: Mar. 31, 2021

(87) PCT Pub. No.: WO2020/070068
PCT Pub. Date: Apr. 9, 2020

(65) Prior Publication Data
US 2021/0392010 A1    Dec. 16, 2021

(30) Foreign Application Priority Data
Oct. 1, 2018 (EP) .................... 18306291

(51) Int. Cl.
*H04L 12/28* (2006.01)
*H05B 47/19* (2020.01)
*H05B 1/02* (2006.01)

(52) U.S. Cl.
CPC .......... *H04L 12/282* (2013.01); *H04L 12/283* (2013.01); *H05B 1/0252* (2013.01);
(Continued)

(58) Field of Classification Search
CPC ................ H04L 12/282; H04L 12/283; H04L 2012/2841; H04L 2012/285;
(Continued)

(56) References Cited

U.S. PATENT DOCUMENTS

| | | |
|---|---|---|
| 6,791,467 B1 | 9/2004 | Ben-Ze Ev |
| 2013/0169549 A1 | 7/2013 | Seymore et al. |

(Continued)

FOREIGN PATENT DOCUMENTS

| | | |
|---|---|---|
| CN | 103186318 A | 7/2013 |
| CN | 104205934 A | 12/2014 |

(Continued)

OTHER PUBLICATIONS

International Search Report and Written Opinion for PCT/EP2019/076457, dated Oct. 21, 2019.
(Continued)

*Primary Examiner* — Tejal Gami
(74) *Attorney, Agent, or Firm* — Meagher Emanuel Laks Goldberg & Liao, LLP

(57) ABSTRACT

The invention relates to the adaptation of the functionalities of a remote control in a local area network. More specifically, it relates to the definition of commands to be sent upon an input of a user, depending either of the commands that can be sent in a RF network joined by the remote control, or of the commands that can be received by a device that the remote control is bound to in a RF network.

8 Claims, 8 Drawing Sheets

(52) U.S. Cl.
CPC ........ *H05B 47/19* (2020.01); *H04L 2012/285* (2013.01); *H04L 2012/2841* (2013.01)

(58) Field of Classification Search
CPC ............ H04L 12/2832; H04L 12/2816; H05B 1/0252; H05B 47/19
See application file for complete search history.

(56) References Cited

U.S. PATENT DOCUMENTS

| | | |
|---|---|---|
| 2013/0244656 A1 | 9/2013 | Heo et al. |
| 2016/0104371 A1 | 4/2016 | Selfe |

FOREIGN PATENT DOCUMENTS

| | | |
|---|---|---|
| CN | 104662994 A | 5/2015 |
| EP | 3119040 B1 | 1/2017 |
| WO | 2007023414 A2 | 3/2007 |
| WO | WO2013188629 A3 | 12/2013 |

OTHER PUBLICATIONS

English Translation of First Office Action and Search Report for corresponding Chinese Application No. 201980064925.3, dated Dec. 13, 2021.

SMART ADAPTATION OF THE FUNCTIONALITIES OF A REMOTE CONTROL IN A LOCAL AREA NETWORK

FIELD OF THE INVENTION

The present invention relates to a device in a Local Area Network (LAN). More specifically, it relates to the adaptation of commands sent by the device upon an input of a user depending on the commands that are allowed by the network, and/or expected by a further device the device is bound to.

BACKGROUND PRIOR ART

A home environment has more and more devices that may be controlled electrically. This is the case of lamps, heating and cooling equipments, windows, shutters or blinds, cooking and food preservation equipments, cleaning devices, entertainment devices, security systems, etc. These devices may be controlled from one or more remote controls, either in Line of Sight (LOS) of the device to be controlled, or from another room. Different types of remote controls may be used: optical (visible or Infrared) for LOS control, radiofrequency (RF) also for LOS, with the caveat that some non-LOS communications are also possible depending on the configuration of the home.

It is advantageous to establish a network in the home, for instance a Radio Frequency (RF) network, to be able to share data between various devices having a same function, in a coordinated manner, i.e. setting the temperature control points of a central heater and of individual heaters connected to the central heater. The RF network may comply with the Wi-Fi, the Bluetooth™ or the Zigbee standard (IEEE 802.15.4). The Zigbee standard is advantageous for this type of applications because of its power saving capabilities. A power line network may also be used in lieu of a RF network that authorizes non-LOS communications but is delicate to install, notably in old buildings.

Also, the devices installed in the home and connected to a network may be controlled from outside the home, using for instance an internet connection to a home or room gateway. The devices may then be monitored and controlled from anywhere in the world using an application running on a desktop, a laptop, a tablet or a smart phone or the like.

Similar problems and solutions arise in office and industrial or commercial buildings, with equipment that may be very costly and that will generally be monitored centrally by a facilities management system.

In all cases, it is necessary to commission the network and its nodes at the time of installation and to create associations between the nodes that will exchange information in operation. In Zigbee terminology, the first operation is called "Joining" and the second operation is called "Binding". This terminology will be adhered to in the rest of this description, although the invention may also apply to other types of networks or radio standards.

Standard networks and protocols, such as Zigbee 3.0, allow interoperability with devices from a number of different manufacturers. Protocols such as Zigbee 3.0 allow the implementation of a large number of features. For example, the commands to turn ON or OFF the electricity of an electric outlet can be sent in a standardized way to any device implementing the standard protocol. Although a large number of different features may be allowed by a standard protocol, the standard protocol cannot, by nature, allow new features at the time they are implemented in a new product, and cannot apply to specific features of a product.

Custom networks or protocols may also be developed to allow, on the same or different radio links, sending specific commands, or more generally communicating in a more specific and adaptive way, with devices sharing the same proprietary protocol. In addition, these protocols can be updated very quickly, for example by a simple software update, when new products and features become available.

Among a number of examples, electric outlets may be controlled remotely using the Zigbee standard. The Zigbee standard defines commands to switch ON or OFF the electricity of the outlet, and thus indirectly control the device that the outlet provides electricity to. For example, if this device is an electric heater, turning ON or OFF the electricity allows turning ON or OFF the heat. However, the standard Zigbee commands lack the adaptation to specific commands that allow a more precise control of heat. For example, in France a wide number of electric heaters can be controlled using the "fil pilote" (French expression for "pilot wire") protocol. The "fil pilote" protocol, which is part of the NFC 15-100 standard, allows sending commands to electric heaters directly from the electric outlet. The control of the electric radiator is performed through standard commands: four main commands, and two additional commands that are sent directly by an electric signal from the electric outlet to the electric radiator. Each command is defined by a specific electric signal shape. The four main commands are: "Comfort", "Comfort −1° C.", "Comfort −2° C." respectively defining commands to set a defined comfort temperature, and temperatures 1 or 2° C. below the comfort temperature, while an "Eco" (for economical) command performs heating using a limited amount of power. The two additional commands are "No freezing" and "Stop". The electric heaters compliant with the "fil pilote" protocol may either comply with the four main commands only, or with the six commands (four main commands+two additional commands). The commands are sent to the heater from the electric outlet by a special signal, and interpreted by the internal thermostat of the heaters.

Therefore, different heaters compliant with the "fil pilote" standard may be configured with different "Comfort" temperature presets. The "fil pilote" standard therefore allows a convenient way to control electric heaters. It is thus possible, using custom Zigbee commands, to control an electric outlet to send "fil pilote" commands rather than simple ON/OFF commands. However, the Zigbee 3.0 standard does not comprise commands relative to the "fil pilote" protocol. Sending such commands using Zigbee therefore requires the definition of custom commands.

The Zigbee standard allows the development of custom protocols using a Manufacturer Specific Profile (MSP). A MSP can be developed for example by a manufacturer to provide additional features to its devices. However, a MSP does not allow interoperability with devices from manufacturers that do not implement the MSP.

Meanwhile, devices in a RF network may be configured to receive different commands. For example, an electric outlet that is able to control electric heaters using the "fil pilote" protocol may receive custom Zigbee commands associated to "fil pilote" commands, which are not defined in the Zigbee 3.0 standard. On the contrary, standard electric outlets that are not able to control electric heaters using "fil pilote" commands may receive only ON/OFF commands, defined in the Zigbee 3.0 standard.

Some existing IoT (Internet of Things) devices are able to communicate using different protocols, for example a protocol compliant with the Zigbee 3.0 standard, and a protocol using a MSP, or to send different commands to other IoT devices they are bound to. However, such devices usually require an input from a user to switch from one protocol to another. This is a cumbersome task for a user. In addition, most users are not familiar with issues relative to protocols used by IoT devices, and may therefore fail to switch to the relevant protocol. Such existing devices are thus not intuitive for a user to use, and may fail to establish connections with other IoT devices.

There is therefore a need for a device that automatically adjusts its communication with the IoT device it is in connection with, and accordingly provides to a user an access to the possible commands of those devices.

SUMMARY OF THE INVENTION

To this effect, the invention discloses first device comprising: a communication link to a RF network; a processor; an input unit to receive inputs from a user; a memory storing a table of data representative of a plurality of commands to send to the RF network; the processor being configured to: use the communication link to send a message to connect with a second device in the RF network; use the communication link to receive a response message from the second device, said response message indicating commands that can be sent by the first device in the RF network, or to the second device; associate, to an input type of the input unit, an associated command of said plurality of commands that is allowed by the RF network or the second device; upon an input of said input type from the use, use the communication link to send to the RF network or the second device a message with said associated command.

Advantageously, the processor is configured to: use the communication link to send a message to join the RF network; use the communication link to receive a response message, said response message indicating commands that can be sent by the first device in the RF network; associate, to an input type of the input unit, an associated command of said plurality of commands that is allowed by the RF network; upon an input of said input type from the user, use the communication link to send to the RF network a message with said associated command.

Advantageously, the plurality of commands to send to the RF network comprises a first and a second sets of commands; the message to join the network is a generic message comprising optional metadata; the response message comprises, if commands from the second set of commands are allowed by the RF network, optional response metadata; the processor is configured, based on said response metadata, to associate, to the input type of the input unit, a command from the second set of commands if the commands from the second set of commands are allowed by the RF network and a command from the first set of commands otherwise.

Advantageously, the communication link to the RF network is configured to operate using a plurality of radio frequencies, at least one radio frequency being associated to at least one corresponding RF network type that allows a corresponding set of commands; the processing logic is configured to: use the communication link to send a message to join the RF network, said message being sent at the radio frequency; if a response message is received at said radio frequency, associate, to the input type of the input unit, an associated command that belongs to said corresponding set of commands.

Advantageously, the processor is configured to iteratively: use the communication link to send a message to join the RF network, said message belonging to a join message type; verify if a response message is received to acknowledge that the first device can join the RF network; if no response message is received, change the join message type.

Advantageously, the processor is configured, upon the reception of a message indicating a change of the commands allowed by the network, to: update the command associated with the input type to an updated command; upon an input of said input type from the user, use the communication link to send to the RF network a message with said updated command.

Advantageously, the processor is configured to: use the communication link to send a binding request to the second device in the RF network; use the communication link to receive a response message from the second device, said response message indicating commands that can be sent by the first device to the second device; associate, to an input type of the input unit, an associated command of said plurality of commands that is allowed by the second device; upon an input of said input type from the user, use the communication link to send to the second device a message with said associated command.

Advantageously, the plurality of commands comprises commands that belong to a standard command library defined by a communication standard, and commands that do not belong to the standard command library; the binding request complies with a communication standard, and comprises optional metadata indicating that the first device is able to send commands that do not belong to the standard command library.

Advantageously, the input unit is a rotatable button or a button with a number of discrete positions; the processor is configured: if the response message indicates that the allowed commands are "switch ON light" and "switch OFF light" commands, associate to each position of the button a "switch ON light" or a "switch OFF light" command; if the response message indicates that the allowed commands are discrete commands of intensity of light, associate to each position of the button a percentage of intensity of light corresponding to its relative position among the discrete positions of the button.

Advantageously, the RF network comprises one or more electric outlets; one or more electric heaters are plugged respectively into said one or more electric outlets; the input unit is a rotatable button or a button with a number of discrete positions; the processor is configured: if the response message indicates that the allowed commands are "switch electricity ON" and "switch electricity OFF" commands, to control said one or more electric outlets, associate to each position of the button a "switch electricity ON" or a "switch electricity OFF" command; if the response message indicates that the allowed commands are commands to configure said one or more electric outlets to send respectively to said one or more electric heaters commands to set a heating mode through an electric signal, associate to each position of the button a command to configure said one or more electric outlet to send respectively to said one or more electric heaters a command to set a heating mode through an electric signal.

Advantageously, said commands to set a heating mode through an electric signal complying with the "fil pilote" protocol of the NFC 15-100 standard.

The invention also discloses a method comprising: using a communication link of a first device to a RF network to send a message to connect with a second device in the RF network; using the communication link to receive a response message from the second device, said response message indicating commands that can be sent by the first device in the RF network, or to the second device; associating, to an input type of an input unit of the first device, an associated command of a plurality of commands that are allowed by the RF network or the second device; upon an input of said input type from the user, using the communication link to send to the RF network or the second device a message with said associated command.

The invention also discloses a computer program product comprising computer code instructions configured to: use a communication link of a first device to a RF network to send a message to connect with a second device in the RF network; use the communication link to receive a response message from the second device, said response message indicating commands that can be sent by the first device in the RF network, or to the second device; associate, to an input type of an input unit of the first device, an associated command of a plurality of commands that are allowed by the RF network or the second device; upon an input of said input type from the user, use the communication link to send to the RF network or the second device a message with said associated command.

The invention advantageously provides to a user a single device to send commands of multiple types to various devices and radio frequency (RF) networks.

The invention allows to set the commands of a remote control, to an extended or a restricted set of commands, depending on the commands that are allowed by a device with which the remote control is in connection.

The invention allows a remote control to control a large number of different devices, with a limited set of inputs, and therefore have compact remote controls to control a large number of different devices.

The invention allows a remote control to adapt the commands sent to the commands that are allowed by a RF network.

The invention allows a remote control to detect the type of network that it joins, and adapt the commands that are sent accordingly. For example, a remote control of the invention is able to use proprietary defined commands when entering a proprietary network, while using standard commands otherwise.

The invention allows a remote control to use different kinds of networks defined by different frequencies, that can be either standard or specific ones, operating at different frequencies, and adapt the commands sent by a remote control to the type of network encountered.

The invention allows a remote control to join different types of network, by order of priority.

The invention allows an adaptation of the commands sent by a remote control using different protocols according to the device it is in connection with, without requiring an input of the user or modifying the user experience.

The invention allows a remote control to be always configured to send the commands which are the most appropriate depending on the current type of RF network or protocol.

The invention allows to automatically adapt the commands sent upon an input of the user to switch to a different type of RF network or protocol, without modifying the user experience.

The invention allows a remote control to automatically adapt to a target device, without the user to perform any kind of input to define the purpose of the remote control.

BRIEF DESCRIPTION OF THE DRAWINGS

The invention will be better understood and its various features and advantages will emerge from the following description of a number of exemplary embodiments provided for illustration purposes only and its appended figures in which.

DETAILED DESCRIPTION OF THE INVENTION

Figure 1:
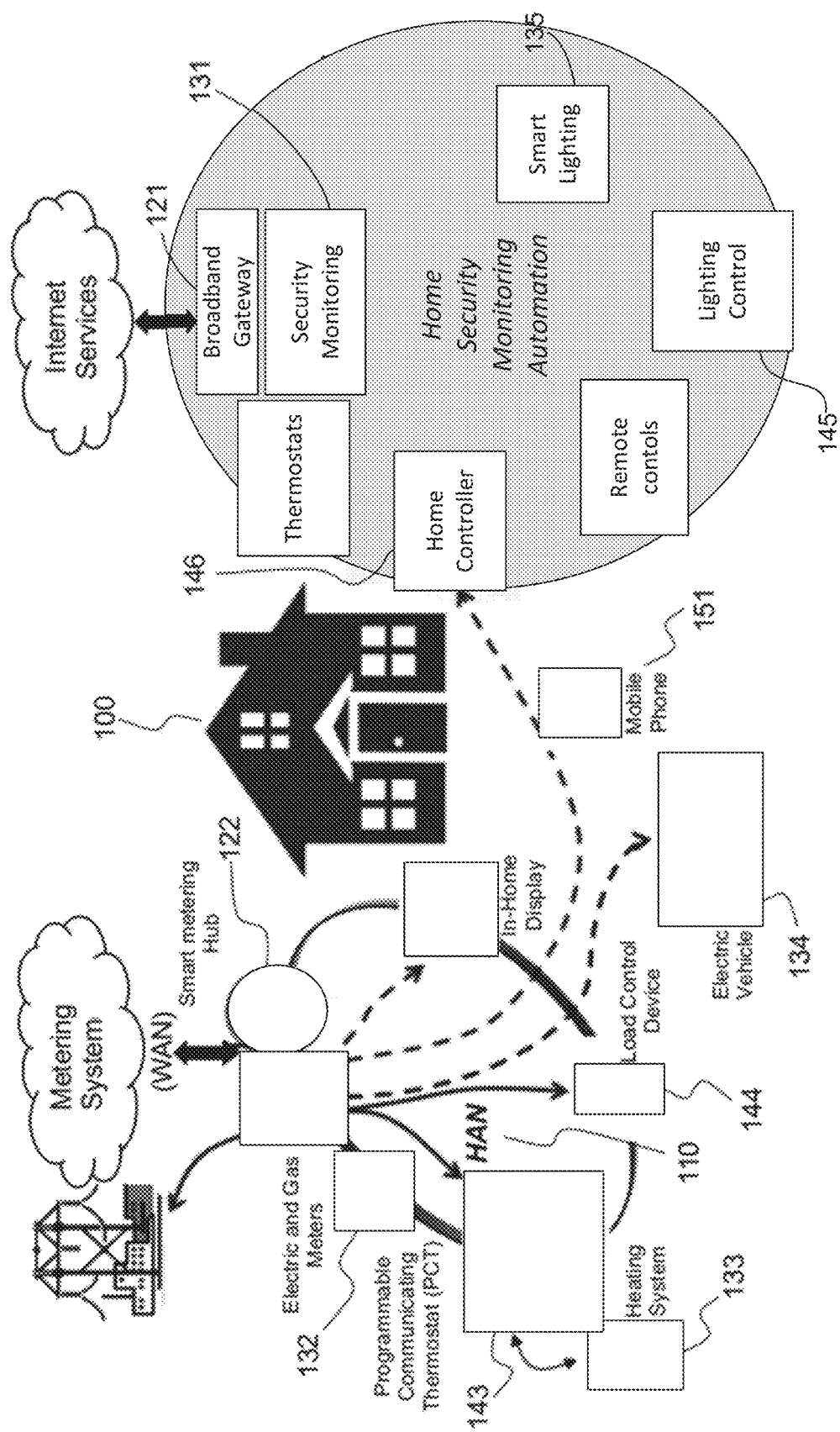
FIG. 1 represents a number of devices with applications in a smart home environment that may be enabled by the invention, in a number of its embodiments.

FIG. 1 represents a number of devices with applications in a smart home environment that may be enabled by the invention, in a number of its embodiments.

The description of the different systems illustrated in FIG. 1 will allow a better understanding of the use cases of the instant invention. Nevertheless, these use cases should not be construed as limitative but only illustrative of the field of application of the invention.

The smart building 100 represented in FIG. 1 has one or more Local Area Networks or Home Area Networks (LAN or HAN, 110). LANs may use various types of transmission layers: Ethernet cable, optical fiber, Power Line Carrier (PLC), wireless transmission. Different protocols may be used. In the case of a wireless transmission media, Wi-Fi or Zigbee are among the most popular. It is likely that 5G will also be used for HAN when it will become available. Zigbee HANs will be described in relation to FIG. 2.

In a building, there may be a single LAN or a plurality of LANs. The option may depend on the obligation to use more than one gateway to communicate to the outside world. For instance, there may be a first gateway 121 to access Internet services and there may be a second gateway 122 to access metering systems 132. This segregation may be imposed by the utility companies (electricity, gas, water, etc. . . . ) managing the smart metering systems because they use proprietary communication means that need to be separate from the other HANs. But in other use cases where the metering is performed through internet applications, it is possible to have the smart meters shared in the same single HAN.

But there may be other reasons to opt for segregated HANs: it may be more efficient to allocate dedicated networks to specific applications. Some exemplary applications are illustrated in FIG. 1, but of course other applications may be envisaged.

A security monitoring application 131 may be deployed in and/or around the building 100. It may consist of a number of sensors such as: visible light or IR cameras; radars or LIDARS; sound detectors, presence sensors, proximity sensors, etc. . . . . Some sensors may be located inside the building. Other sensors may be located outside the building. The sensors may capture data systematically or selectively. Selectivity may be made contingent on predefined types of objects or events being detected. Sensor data may be monitored locally or remotely. Monitoring may trigger alarms, also locally or remotely. Alarms may be acoustic signals, optical signals, or in the form of a message to a remote response center that will send security staff on-site.

The heating system 133 of the building 100 may be a programmable heating system controllable locally by a Programmable Communicating Thermostat (PCT, 143). The PCT may have one or more temperature setpoints. The temperature setpoints may be entered manually in the PCT. A plurality of temperature setpoints may be programmed locally on the PCT based on a daily timeline (early night/mid night/late night/early morning/midday/late day temperature setpoints, by way of non-limitative examples). The PCT being connected to a HAN, it may also be programmed remotely, for instance using an application installed on and/or accessible from a mobile phone 151. In some embodiments of a heating system, thermostatic radiators may be installed on some or all of the radiators of the heating system and their temperature setpoints may also be controlled either locally or remotely. Also, a refrigerating equipment may be controlled locally or remotely in a way that is similar to the way a heating system is controlled.

An electric vehicle 134 may be reloaded using a Vehicle Charging Device (VCD) in a garage of the building 100. The VCD may be controlled locally using a Load Control Device 144. The charge dispensed by the VCD may also be controlled remotely using an application.

A Smart Lighting System (SLS, 135) may be also installed in the building 100. A SLS may consist of a number of smart light bulbs or of a number of smart plugs where lamps may be plugged. The smart light bulbs and smart plugs are equipped with control boards or Systems on Chip (SoC). A lighting control 145 will then allow controlling the current in the smart light bulb or plug to be switched from the OFF state to the ON state and vice-versa or to be varied to reduce/increase the brightness of the light. There may be one remote control per room. In some instances, a remote control may be combined with another switch to form a two-way switch. But there may be also a plurality of lighting controls in a room or a central lighting control from where a number of rooms may be controlled. It is to be noted that equipments that are not lamps may be plugged in a smart plug, such as an electric heating equipment, an electric cooking equipment, or any other kind of electric equipment whose functioning can be commanded both in a binary manner or in a continuous manner.

Other types of systems, not displayed in the figure, may also be included in a HAN. For instance, blinds/shutters may be equipped with electric motors and controlled and actuated either locally (room by room or centrally) or remotely. TV sets may be equipped to be programmable remotely, for instance to record programs for later playback. A number of sensors may be placed inside or outside the building to monitor the temperature, the quality of ambient air, the intensity of wind, the humidity, the amount of rain, etc. The measurements of the sensors may be sent to a server of a service provider for processing, consolidation and redistribution to the service subscribers. The measurements may also be sent only to the owner or tenant of the building, partially (privacy issues) or in total.

The controllers of the various smart control applications or subsystems running in the building 100 may be centralized at a central home controller 146. From the central home controller, it may be possible to control all applications, or only some of them. In some embodiments, the central home controller may be accessible remotely. Also, the central home controller 146 may be equipped with a screen to display the different components of the subsystems, data, images or graphics gathered by sensors of the subsystems, setpoints, alarms, parameters, etc. In some embodiments, the screen may be a tactile surface or another input device specially adapted to the user or the application.

According to the invention, some or all of the devices or equipments of the different subsystems 131, 132, 133, 134, 135 are connected to a LAN/HAN that is an RF network. Other subsystems not displayed in the figure may also be connected to the HAN. Also, the controlling devices, 143, 144, 145 of some of the subsystems, and of subsystems not displayed in the figure should be connected to the HAN in a manner now commented upon in relation to FIG. 2.

Figure 2:
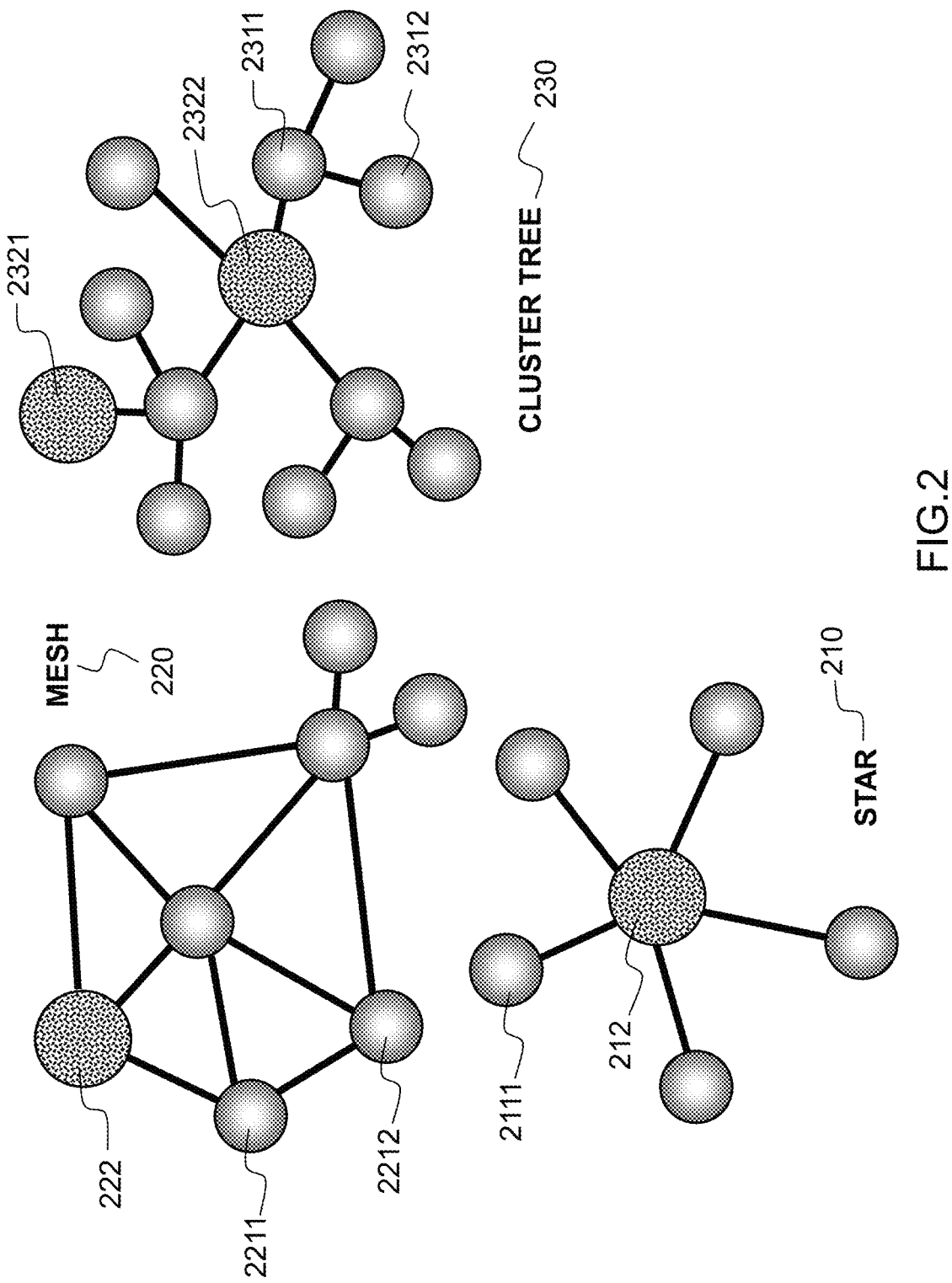
FIG. 2 represents a topology of a Zigbee network with which the invention may be implemented, in a number of its embodiments.

FIG. 2 represents a topology of a Zigbee network with which the invention may be implemented, in a number of its embodiments.

In some embodiments of the invention, the LAN/HAN is a Zigbee network. This does not mean that the invention cannot be used with other HANs or LANs (also sometimes called Personal Area Networks or PANs). For instance, the invention may also be used with a Wi-Fi network.

Zigbee networks are the subject of a specification developed by Zigbee Alliance that comprises a number of device manufacturers. The Zigbee network specification is an IEEE standard (IEEE 802.15.4). It is applicable to Wireless Personal Area Networks (WPANs). It encompasses short-range Line of Sight (LOS, 1-10 m), low-power devices. Zigbee networks are well suited for communicating devices at intermittent, low data rate that need to have a long battery life and a secure communication protocol. Zigbee communications use a 20 to 250 kb/s data rate and an encryption 128-bits symmetric key.

The RF frequencies used for the Zigbee communications are some of the Industrial Scientific and Medical (ISM) frequency bands that have the advantage of being loosely regulated. The 2.4 GHz frequency band is available for these applications in most jurisdictions. Alternatively or in addition, the 784 MHz band is available in China, the 868 MHz band is available in Europe and the 915 MHz band is available in the USA and Australia.

The objects connected to the network are designated as Zigbee Device Objects (ZDOs). They may be sensors, actuators, input devices or any type of devices that may be controlled or actuated, such as the ZDOs of the invention. ZDOs will then comprise a device control unit or Smart Electric Controller (or SEC) comprising a Zigbee transmit/receive (T/R) unit comprising or associated with a number of circuits like a processor, a memory, a power control circuit connected on a bus. The SEC may be embodied in an electronic board or in a System on Chip (SoC) circuit. Examples of such SoCs (including or not additional circuitry of the type mentioned above) comprise:

the MRF24J40 from MICROCHIP™;
the CC2650 from Texas Instruments™;
the EM358x and EFR32MGxxxxx from SiliconLabs™;
the ATSAMR21 from MICROCHIP™.

Other devices may of course be used without departing from the scope of the invention and it is likely that, with the advancement of communication technologies and devices, other devices and standards may appear in the future.

Typically, three architectures of a PAN/Zigbee network may be envisaged: a star architecture 210, where all ZDOs, for example the ZDO 2111 communicate only with a PAN coordinator 212; a mesh architecture 220, where all ZDOs 2211, 2212 communicate with a PAN coordinator 222, either directly or indirectly, as well as with the other ZDOs of the network 2212, 2211; a cluster tree architecture 230, that may have more than one PAN coordinator 2321, 2322, to and from which the ZDOs 2311, 2312 may communicate as well as to and from other ZDOs, 2312, 2311.

In the mesh architecture and in the cluster tree architecture, the communication range may be extended by device-to-device relay of messages, possibly in non-LOS.

The PAN/Zigbee coordinator 212, 222, 2321, 2322 is a specific network node that is configured to maintain/control a list of the addresses/identifiers of the network nodes. The PAN/Zigbee coordinator may be coupled to a gateway to another PAN, another LAN, a WAN or to Internet services to provide extended communication capabilities, symmetric or one-way only.

The Zigbee protocol layer supports two types of services:
The cluster service (e.g key-value pair service or KVP) is meant for configuration purposes; it enables description, request and modification of object attributes through a simple interface based on getting/setting values as well as event primitives, some allowing a request for a response. Configuration uses compressed or full XML.

The Message service is designed to offer a general approach to information treatment, avoiding the necessity to adapt application protocols and potential overhead incurred by KVP. It allows arbitrary payloads to be transmitted over APS (APplication Sublayer) frames.

The cluster and message services that can be used, and more generally the messages that may be exchanged in a Zigbee network are defined by profiles. The Zigbee profiles are defined by a unique ID. Zigbee supports both public profiles (for example Industrial Plant Monitoring (IPM) profiles, or Home Automation (HA) profiles that allow interoperability between devices from different manufacturers), and Manufacturer Specific Profiles (MSP) that are more flexible, may provide extended functionalities and be updated easily, but do not allow interoperability with all Zigbee-compliant devices.

One of the problems to be solved in Zigbee networks is to be able to use the most suitable profiles and communications, to be able to benefit, when available, from the extended features of MSPs, and, otherwise, preserve interoperability with all Zigbee-compliant devices.

One solution consists in providing a device which is able to use both MSP, and public profiles, wherein the user selects the profile that he/she wishes to use. However, this solution represents a burden for the user, and is subject to errors when the user selects a profile that is not adapted to the network that is being commissioned.

Thus, a less tedious, more automatic and quick manner to perform the commissioning of a Zigbee network is needed. This is especially advantageous in the use case of a Zigbee HAN where a large number of devices have to be bound, like for example for a SLS where there is a large number of remote controls that need to be joined to the network and bound to smart lights or plugs. The same issue arises in other kinds of RF networks.

The invention fulfills these needs and others as explained below.

Figure 3:
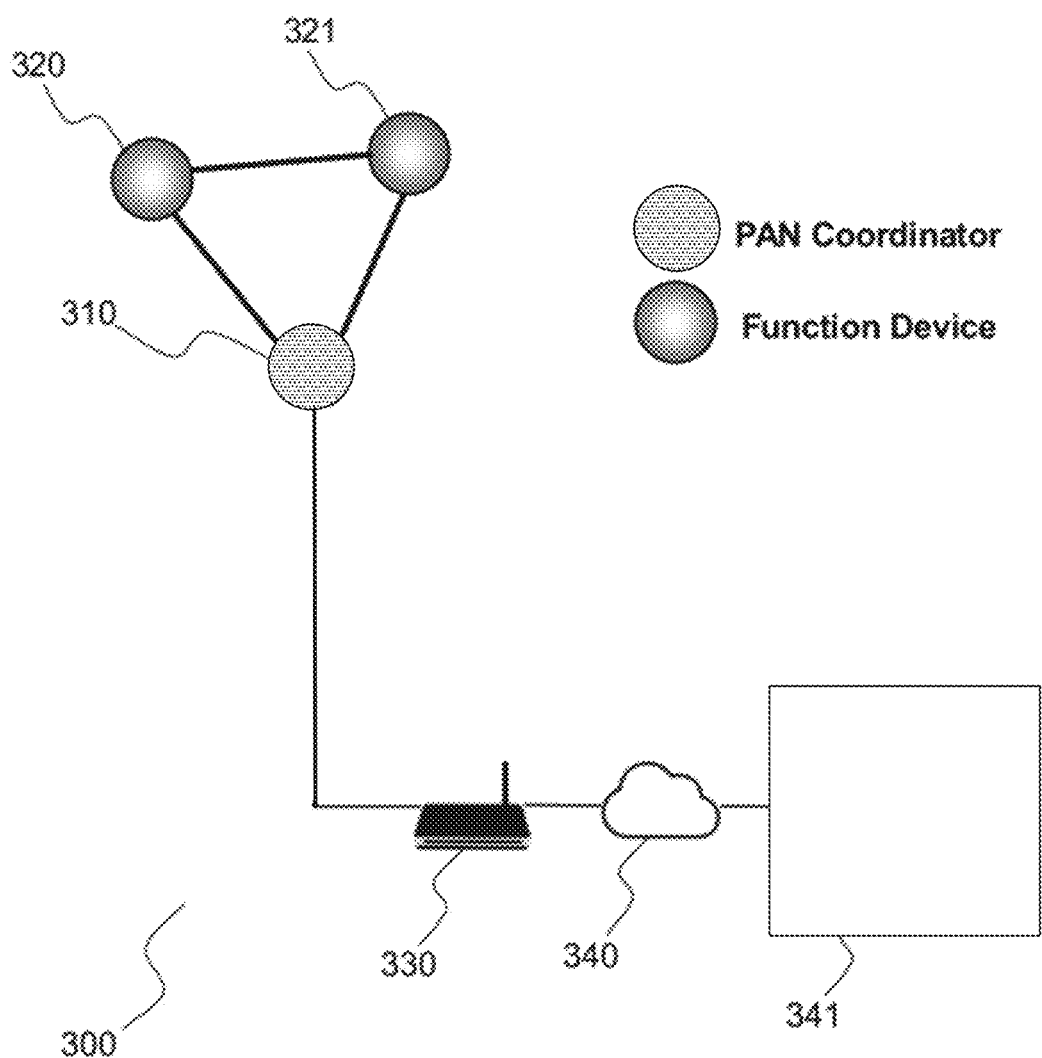
FIG. 3 represents a topology of a Zigbee network comprising a Wi-Fi Gateway, with which the invention may be implemented, in a number of its embodiments.

FIG. 3 represents a topology of a Zigbee network comprising a Wi-Fi Gateway, with which the invention may be implemented, in a number of its embodiments.

The network 300 comprises a coordinator 310, and two ZDOs 320, 321. The PAN coordinator 310 serves as a gateway to a Wi-Fi router 330, itself connected to a number of servers 341 through an internet connection 340. This allows the PAN coordinator 310 to communicate with internet devices through the Wi-Fi router 330. For example, this allows communicating remotely with a smart device (e.g smartphone, tablet, personal computer . . . ) of the user, so that a user can receive information from the network 300, and send instructions to the network 300. For example, if the ZDO 320 is a thermometer, and the ZDO 321 is a heater control in a house, the user can remotely receive temperature measurements from the thermometer, and activate the heater 321. More generally, this architecture may implement a large number of applications allowing a user to remotely receive information from a HAN, and control devices of the HAN. A network such as the network 300 allows other applications. For example, measurements from the ZDOs can be sent periodically to the servers 341, in order to monitor the evolution of the measurements of a number of physical fields within a house. This may for example allow raising alerts if an unexpected or dangerous event is detected, such as an excessive concentration of carbon monoxide, or if a fire is detected. The gateway network 300 also allows easier updates of the devices, remote diagnosis, and control of devices from an app or WebApp that remotely communicates with the gateway. Performing remote updates allows adding new functions to previously sold products efficiently.

The network 300 may also allow, if a MSP (Manufacturer Specific Profile) is used, the ZDOs 320, 321 to communicate directly with remote devices (for example a smartphone, tablet, personal computer of a remote user) through the internet connection 340: special clusters may be defined in the MSP to exchange messages with the remote devices through the internet connection 340. Such messages are transmitted through the PAN coordinator 310.

Figure 4:
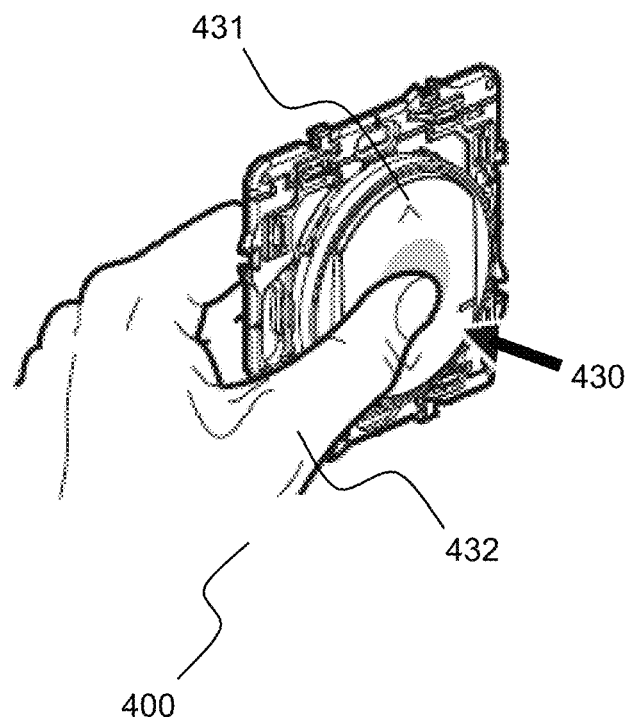
FIG. 4 represents an exemplary device of the invention.

FIG. 4 represents an exemplary device of the invention.

The device 400 is a remote control that allows remotely controlling target devices. The device 400 can be held by a user in his/her hand and freely moved in space. The device 400 can be bound to various devices and networks, and send commands to the target devices that are adapted depending on the target device or network that the device 400 is bound to.

The device 400 is a switch comprising a button 430, having two positions: a position up 431, and a position down 432. The device 400 also comprises a Zigbee T/R unit, not shown here, to communicate with remote devices. The device 400 can be used to control a target device according to the inputs of the user to the button 430.

The device 400 is able to adapt the commands that are sent according to the target device to control, and/or the type of network that the device 400 enters. For example, the device 400 can be used to control a shutter, by opening the shutter when the user presses the top button 431, and closing the shutter when the user presses the down button 432. The same device 400 can also be used, for example, to control a light, by switching ON the light, when the user presses the top button 431, and switching OFF the light, when the user presses the bottom button 432.

The device 400 can be used to control various types of IoT devices. For example, it can be used to control a number of devices displayed in FIG. 1, for example:
the PCT thermostat 143 depicted in FIG. 1, by setting the temperature setpoint to a higher temperature if the user presses the "up" position 431 of the button, and to a lower temperature if the user presses the "down" position 432 of the button;

the SLS 135 depicted in FIG. 1, by setting the light ON when the user presses the "up" position 431 of the button, and OFF when the user presses the "down" position 432 of the button;

blinder/shutters, by opening the blinders/shutters when the user presses the "up" position 431 of the button, and closing the blinders/shutters when the user presses the "down" position 432 of the button;

etc. . . .

This example is provided by means of non-limitative example only, and the invention is applicable to virtually any remote control that may be configured to send different commands depending upon the inputs of the users. For example, the remote control may comprise different input units, such as a variator or a touch screen, instead of the button 430.

The device 400 is represented in FIG. 4 by a specific device that serves only as a remote control. However, a device of the invention may also be a multi-purpose device having input interfaces and that are configured to send commands to user devices, wherein the command sent upon inputs of a user are adapted. For example, the invention may be implemented within the mobile phone 151 or the home controller 146 displayed in FIG. 1. The invention may also be embedded in a tablet, smart watch, etc. . . .

The invention may for example be embedded in a "universal remote control" application of a smartphone that allows the user, using a single input interface (for example a touch button displayed on the screen of the smartphone), to send various types of commands. Such a device can bind to other IoT devices using the connection capabilities (NFC/RF . . . ) that are present in virtually all modern smartphones. The smartphone can thus be used as a universal controller using a single user input interface. Moreover, such an application can be updated easily to support newer devices and/or newer protocol/commands.

The underlying mechanism allowing a device such as the device 400 to adapt the commands associated with the inputs of the user are described in more details hereinafter.

Figure 5:
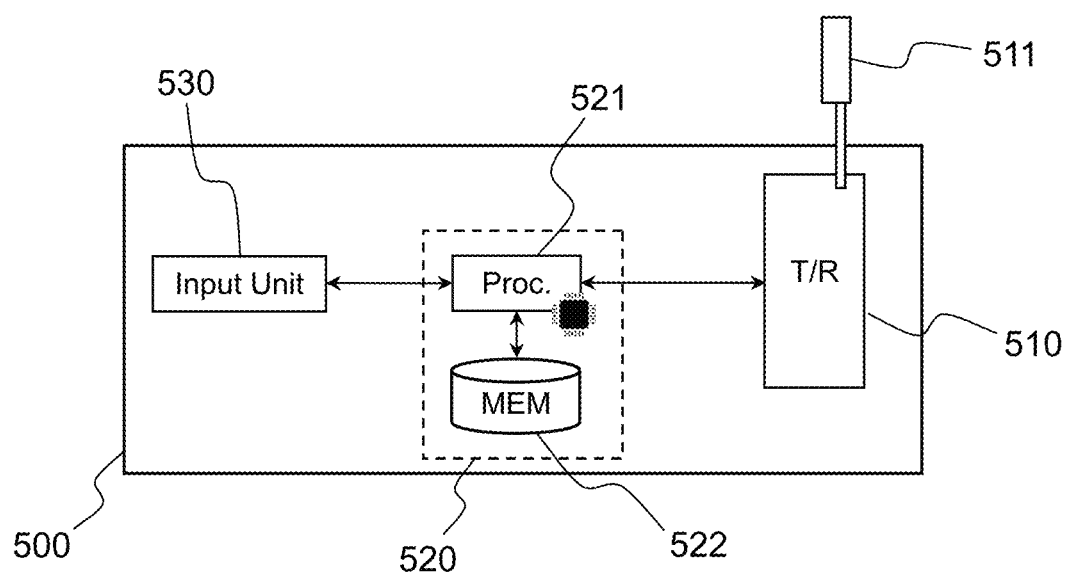
FIG. 5 represents a schematic of a remote control according to the invention.

FIG. 5 represents a schematic of a remote control according to the invention.

The remote control (RC) 500 may be for example the RC 400, but is not limited to this example, and can be any device or controller of the invention. The remote control 500 will also, in the remaining of this specification, be referred to as the "first device".

The remote control 500 comprises a communication link 510 that may be a Zigbee T/R module of the type described above (discrete components or SoCs). The T/R module has an antenna 511.

It also comprises an input unit 530 to enter commands to be sent by the Zigbee T/R module of the control circuit to one or more ZDOs. The input unit 530 may be a simple ON/OFF button, a rotatable button or a button with a number of discrete positions. It may comprise a plurality of buttons. It may also be a touch screen, touch panel that will allow a display of the set of commands that are available for a specific appliance, or motion sensing unit that interprets the motions imparted by a user to the RC 500 as inputs. In all embodiments, the input device 500 will comprise a circuitry 520 and control logics to convert the commands entered in the input unit into digital signals to be sent to a ZDO to which the RC 500 is bound.

The control input in the remote control will only be operative to control a ZDO or SEC when the remote control has also joined the Zigbee network and has been bound to said smart electric controller.

In some embodiments, a motion sensor such as a single axis accelerometer or an accelerometer (not shown in the figure) with a plurality of axes may be included in the remote control to detect a "tap-tap" between the remote control and a smart electric controller to which the remote control should be paired. The "tap-tap" is a convenient way of joining a network that has been developed by the applicant: a shock between two devices is detected and interpreted as a joining request from a first to the network a second device belongs to. The accelerometer may be replaced by a proximity sensor. Such "tap-tap" will be performed by a person in charge of commissioning the devices to the network. Alternatively, the accelerometer or proximity sensor may be provisioned in the SEC. Or the two devices may comprise an accelerometer.

Alternatively, the RC 500 may include an Infrared Light emitter, a visible light emitter or an RFID or NFC tag (not shown in the figure). Then, the binding may be triggered by an exchange of electromagnetic signals using these transmission media. Binding will be possible only with SECs having the same features, i.e. devices that are able to send and receive interoperable commands.

In some advantageous embodiments, the joining and the binding of the remote control may be performed simultaneously.

It is to be noted that a remote control may be bound to more than one smart electric controller or ZDO. Conversely, more than one remote control may be bound to one smart electric controller. For instance, an electric appliance in a room may be controlled at the same time by a smart electric controller that is located in the room, and a smart electric controller that is common to all rooms and electric appliances in the building.

The remote control may be fixed to a wall of a room where a number of electric appliances to be controlled are located. It may be located in one of the rooms of the building and be configured to control all the electric appliances of the building. It may be a portable device that can be transported by a user. It may also be a combination of the two configurations, i.e. a portable device that can be set to rest in a specific lodging, located for instance on a wall of a room.

In an embodiment where the electric appliances to be controlled are, for instance, lamps in a room, the remote control will be configured to control all the lights in the room at the same time, i.e. all the lamps in the room will receive the same commands simultaneously: for example, all the lamps may be switched OFF or ON at the same time or the same luminosity level can be set for all the lamps simultaneously. In other embodiments of the invention, the remote control may be configured to control only one of the electric appliances at the same time. For instance, if the remote control is bound to all smart electric controllers in a room, the appliance to be controlled at a moment in time may be selected by an ID number or by a name (Bedside right lamp, Bedside left lamp, TV set, radio, etc. . . . ).

The RC 500 is remarkable in that the control circuit 520 adapts the commands to be sent upon an input of the user to the commands that are allowed by the RF network. For example, if the input unit 530 is simple ON/OFF button, the ON/OFF button may be used either to switch ON/OFF a light, or to open/close a shutter, depending on the ZDOs that are present in the network, and therefore the commands that are allowed. In another example, a button with a number of discrete positions may be used either to set an intensity of the light, if a light with variable intensity is available, or to set the light ON/OFF, if the only possible commands of a light are ON/OFF commands.

To this effect, the control circuit may comprise a processor 521 and a memory 522 or, alternatively, the microcontroller and/or the memory of the T/R module may be used. The processor 521 may be a microcontroller unit or another type of processor, such as a microprocessor for example. The memory 522 stores a table of data representative of a plurality of commands to send to the RF network. For example, the memory 522 stores a table of data representative of the commands that can be sent upon inputs of the users using the input unit 530.

Such commands are dependent upon the input unit 530. For example, if the input unit is a simple ON/OFF button, the commands may be commands to switch ON/OFF light, open/close a shutter, etc. . . . . In another example, if the input unit is a rotatable button or a button with a number of discrete positions, the commands may be commands to define an intensity of light in a scale, to define a level of openness of a shutter, or to define different "fil pilote" commands (in the latter case, the commands can be defined in an intuitive way for the user. For example they may be ordered from the command that provides the lowest amount of heat to the command that provides the highest amount of heat: "Eco", "Comfort −1° C.", "Comfort −2° C.", "Comfort").

An input unit 530 like a rotatable button or a button with a number of discrete positions, may also be used either to send commands to define an intensity of light in a scale, or to turn a light ON/OFF.

Figure 6A:
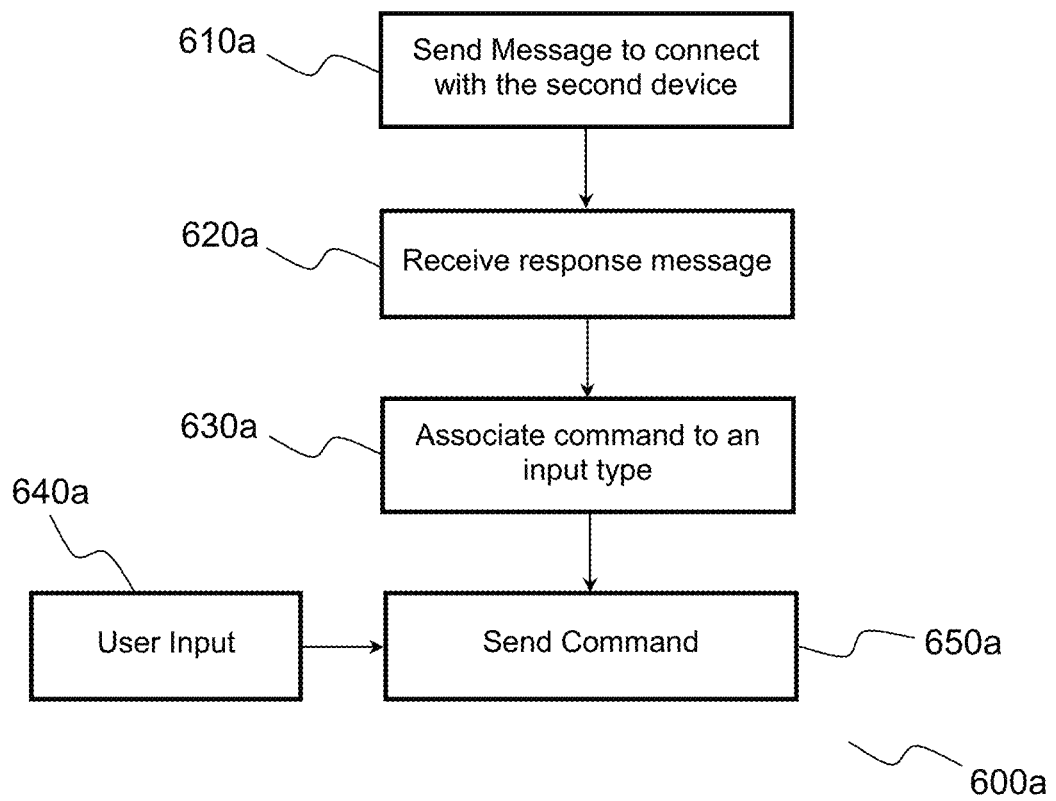
FIGS. 6*a*, 6*b* and 6*c* represent three flow charts of procedures to connect to a second device in a RF network in a number of embodiments of the invention.
Figure 6C:
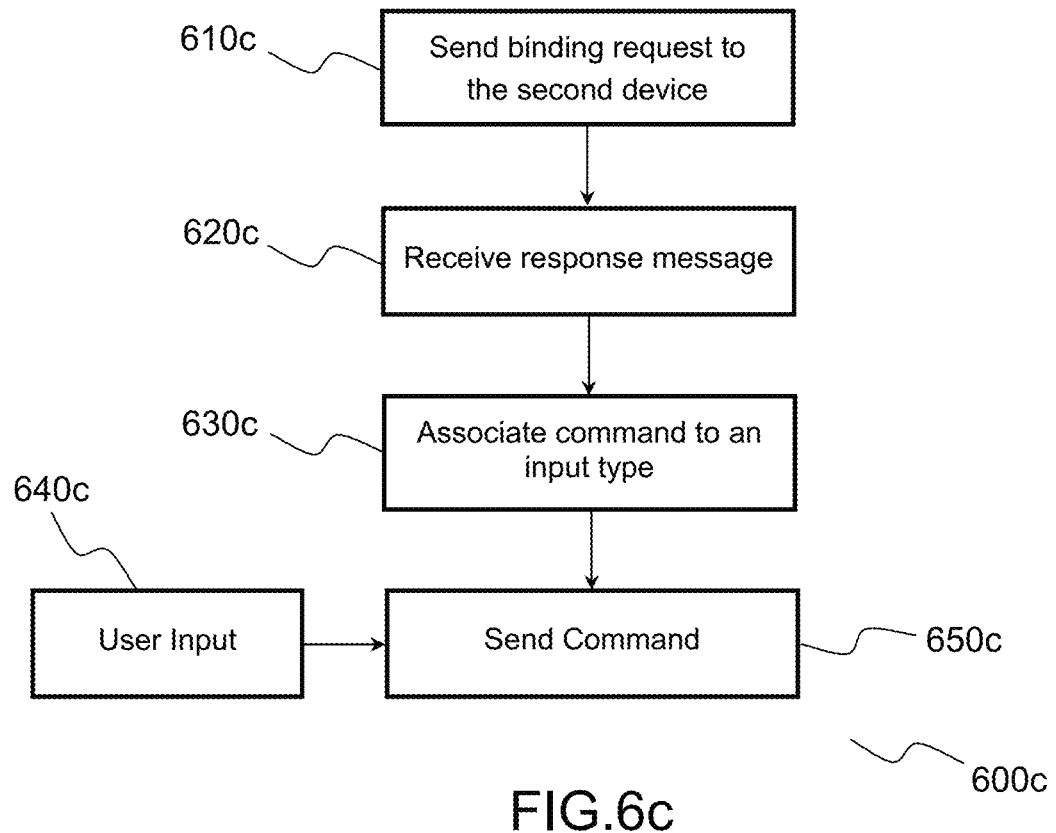
Figure 6B:
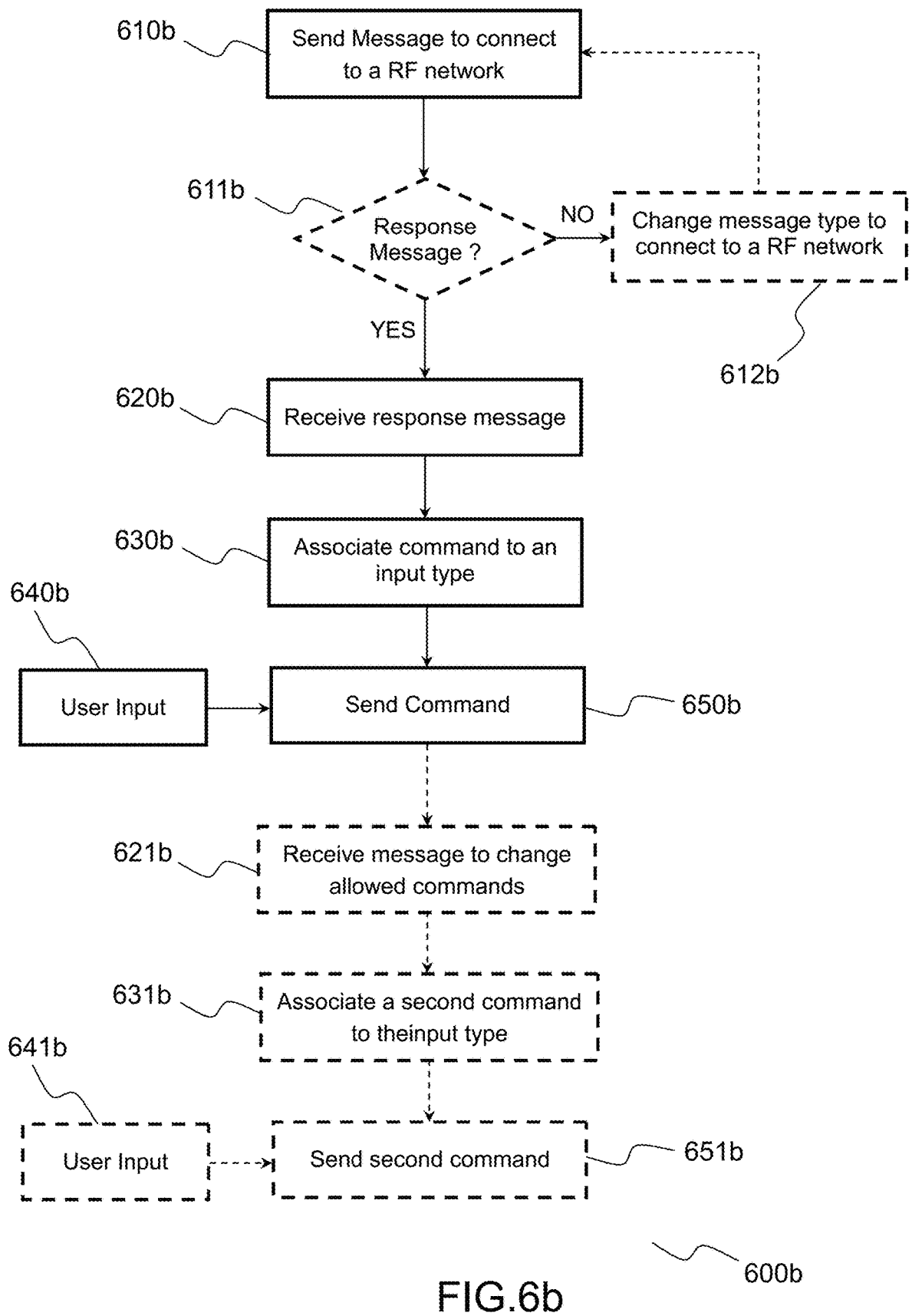

FIGS. 6a, 6b and 6c represent three flow charts of procedures to connect to a second device in a RF network in a number of embodiments of the invention.

FIG. 6a represents a flow chart of a procedure to connect to a second device in a RF network in a number of embodiments of the invention.

The procedure 600a can notably be executed by the processor 521, and can more generally be executed by any device of the invention. Although the procedure 600a will be explained in relation to the processor 521, the procedure 600a may be executed by any processor or device of the invention.

The processor 521 is first configured to use the communication link to send 610a a message to connect with a second device in the RF network. As will be explained in more details in relation with FIGS. 6b and 6c, this can be either performed by sending a message to the second device to join the RF network the second device belongs to, or sending, within the RF network, a message to bind with the second device. Examples of such messages will be provided in relation to FIGS. 6b and 6c.

The second device may be any device that the first device can connect to within a RF network. More specifically, the second device may be any device that can be controlled by the first device. For example, the second device can be a shutter, a thermostat, a binder, or more generally any device that can be controlled within a network, for example a HAN. The second device may also be a controller or another node of a Zigbee network.

The processor 521 is further configured to use the communication link to receive 620a a response message from the second device. The response message notably acknowledges that the first device can join the RF network, and/or bind with the second device.

The response message indicates commands that can be sent by the first device to the RF network, or to the second device. Indeed, the commands that can be sent by the first device shall be allowed by the RF network, and/or by the second device. The step 620a therefore allows obtaining a list of the commands that can be sent to the RF network, or to the second device.

The processor 521 is further configured to associate 630a, to an input type of the input unit, an associated command that belongs to the plurality of commands stored in the memory 522 and that is allowed by the RF network or the second device.

The processor 521 is further configured, upon an input of said input type from the user 640a, to use the communication link to send 650a a message comprising said associated command to the RF network or the second device.

These steps allow associating to an input type a command that the first device is configured to perform and that is allowed by the RF network or the second device.

For example, if the input unit 530 is a simple ON/OFF button, with two possible inputs "ON" and "OFF", and the response message indicates that the allowed commands are "switch ON light" and "switch OFF light" commands, the "switch ON light" command can be associated to the "ON" input, and the "switch OFF light" command to the "OFF" input. Afterwards, each time the user presses the button "ON", a "switch ON light" command is sent, and each time the user presses the button "OFF", a "switch OFF light" command is sent, to switch ON or OFF one or more lights in the RF network.

Similarly, if the input unit 530 is a simple ON/OFF button, with two possible inputs "ON" and "OFF", and the response message indicates that the allowed commands are "open shutter" and "close shutter" commands, the "open shutter" command can be associated to the "ON" input, and the "close shutter" command to the "OFF" input. Afterwards, each time the user presses the button "ON", an "open shutter" command is sent, and each time the user presses the button "OFF", a "close shutter" command is sent, to open or close one or more shutters in the RF network.

Therefore, the procedure 600a allows adapting, within a single device, the commands to be sent to a network. A user is thus advantageously provided with a single device to send commands of multiple types to various devices and RF networks. The allowed commands can be updated according to a profile of the device to control.

The procedure 600a may also be used to restrict the functionalities provided by the first device, to the possible commands allowed by the second device and/or the RF network.

For example, if the input unit 530 is a rotatable button or a button with a number of discrete positions:
  if the response message indicates that the allowed commands are "switch ON light" and "switch OFF light" commands, each position of the button may be associated with either a "switch ON light" or a "switch OFF light" command. For example, the positions may be ordered, and can be split into a first half associated with a "switch OFF light" command, and a second half associated with a "switch ON light" command. Upon an input of the user, a "switch ON light" or "switch OFF light" command may be sent depending on the position that is selected;
  if the response message indicates that the allowed commands are discrete commands of intensity of light, for example commands to set an intensity of light from 0% to 100%, each position of the button may be associated with a percentage of intensity of light corresponding to its relative position among the discrete positions of the button, and, upon an input of the user, a command of an intensity of light may be sent depending on the discrete position that is selected. The device thus operates in a dimmer mode, and is able to set the intensity of the light.

The same principle is applicable to other applications. For example, a device of the invention may be able to send some or all of the commands below:
- to a heating device, "heat ON" or "heat OFF" commands, or commands to set an intensity of heat depending on the allowed commands;
- to a shutter, "open/close" commands, or commands to set a level of opening, depending on the commands allowed by the shutter;
- to an electric outlet to which an electric heater is plugged, commands to configure the electric outlet to send "fil pilote" commands to the electric heater, or commands to switch the electricity ON/OFF.

The examples above demonstrate the ability of a device according to the invention to send to a device the commands that are the most adapted to the capabilities of the device.

The same principle may be applied to any kind of device that may allow a different number of commands. For example, the openness of a shutter may be either controlled with open/close commands or with a level of openness depending on the commands that are allowed by the shutter and/or the RF network.

The procedure 600a therefore advantageously supports a setting of the commands of a remote control, to an extended or a restricted set of commands, depending on the commands that are allowed by the target device the remote control is connected to.

The procedure 600a also allows a remote control to control a large number of different devices, with a limited set of inputs, and therefore benefit from compact remote controls to control a large number of different devices.

FIG. 6b represents a flow chart of a procedure to connect to a RF network in a number of embodiments of the invention.

The procedure 600b can notably be executed by the processor 521, and can more generally be executed by any device of the invention. Although the procedure 600b will be explained in relation to the processor 521, the procedure 600b may be executed by any processor or device of the invention.

The processor is first configured to use the communication link to send 610b a message to join a RF network. According to various embodiments of the invention, the joining of the RF network can be performed in many different manners.

For example, European patent application n° 16306793.7 filed by the same applicant discloses devices which are configured to perform the joining of a RF network when a first predefined event occurs.

In an embodiment, the first predefined event consists in powering up simultaneously the first device that was not in the network and the second device already in the network, and initiates a joining request sent by the first device to the second device. The joining may be declared successful if the powering times of the two devices are reasonably similar and if a validation is received by the second device already in the network. The validation can be for example an intentional press on a switch of the network to ensure that the network is not built without the consent of the user. In a number of variants, the joining request may comprise an input of an ID of the requesting node that will have to be validated by the receiving node.

In another embodiment, the first predefined event may be a validation by a network node of a joining request sent by the first device to a network node using a pair-to-pair communication protocol on an electromagnetic carrier signal. The electromagnetic signal carrying the request may be an infrared carrier, a visible light carrier, an RFID carrier or an NFC carrier. In an embodiment, the signal may have a waveform that is proprietary and is an identifier per se. It may also be an encrypted identifier that is carried by the signal and decrypted at the receiving node.

These embodiments provide the advantage that the user can easily and intuitively select the network that the first device should join by triggering the first predefined event.

However, the invention is not restricted to this example, and any embodiment that allows sending messages to join a RF network is applicable to the invention. For example, when an event such as a click on a button occurs, the first device can send messages to join RF network to nearby devices.

The processor 521 is further configured to use the communication link to receive 620b a response message, said response message indicating commands that can be sent by the first device to the RF network.

The processor 521 is further configured to associate 630b, to an input type of the input unit, an associated command of said plurality of commands that is allowed by the RF network.

Upon an input of said input type from the user 640b, the processor 521 is configured to use the communication link to send 650b to the RF network a message with said associated command.

The procedure 600b is advantageous, since it allows a remote control, or first device, to adapt the commands that are sent to the commands that are allowed by a RF network. For example, as exemplified with reference to the FIG. 6a, the remote control may be configured to send commands such as commands to switch ON/OFF lights, open/close shutters or the like, depending on the commands that are allowed by a RF network.

A number of embodiments allow sending a message to join a RF network, and receive a message that indicates commands that can be sent by the first device in the RF network.

In a number of embodiments of the invention, the first device is configured to send commands that belong to a standard and that can thus be successfully received by devices from a large number of manufacturers. For example, the first device may be able to send commands defined by the Zigbee Cluster Library (ZCL).

The ZCL is a library of commands that is defined by the Zigbee standard, and comprises a wide number of commands, such as commands to switch electricity ON or OFF in an electric outlet. The Zigbee standard advantageously allows devices from different manufacturers to share a wide number of different commands defined by the ZCL.

However, due to its standardized nature, the ZCL cannot be extended to encompass specific or more precise commands. For example, the ZCL comprises commands to configure an electric outlet to turn ON or OFF the electricity. This allows indirectly controlling the temperature, if the outlet provides electricity to an electric heater plugged to the outlet. However, the ZCL does not define commands to instruct an electric outlet to send "fil pilote" commands. On the contrary, the invention allows defining a set of commands specifically tailored for the needs of a user. For example, a user may wish to configure an electric outlet to send "fil pilote" commands to an electric heater. In this case, a command associated to a type of inputs from the user can be a command to send a defined "fil pilote" command (for example, a "Comfort" or "Eco" command) to the electric heater. The commands can be defined by a user, for example in an application in connection with the gateway of the network.

It is therefore desirable for a device of the invention to be able to send:
- commands that belong to an extended set of commands if the first device joins a RF network that allows an extended set of commands that do not belong to a standard, and
- commands that belong to a set of standard commands otherwise.

In a number of embodiments of the invention, the plurality of commands to send to the RF network stored by the memory 522 comprises a first and a second set of commands. For example, the first set of commands can be formed by the commands defined by the ZCL, while the second set of commands is an extended set of commands that comprises, in addition to the commands defined in the ZCL, additional commands. For example, the second set of commands may comprise commands defined by a MSP. Alternatively, the plurality of commands may comprise more than two sets of commands, if the first device is able to join more than two types of RF networks.

In a number of embodiments of the invention, the message to join the network can be a generic message that comprises optional metadata. For example, a joining message that complies with the ZCL can be sent, that comprises additional metadata. The metadata can for example be metadata indicating that the first device is built by a manufacturer, and is able to send commands from the second set of commands.

If the RF network comprises devices that are able to receive commands from the second set of commands, for example devices from the same manufacturer as the first device, these devices will correctly interpret the optional metadata of the generic message, and respond with a response message that indicates through optional metadata that commands from the second set of commands are allowed by the RF network. Otherwise, the optional metadata of the joining message is not processed by the devices in the RF network, and the response message is a standard response message indicating that the network can be joined.

In the former case, if the commands from the second set of commands are allowed by the RF network, and the processor is configured to associate 630b, to the input type of the input unit, a command from the second set of commands. Otherwise, the processor 521 is configured to associate to the input type a command from the first set of command.

This embodiment advantageously allows the first device to send specific commands if they are allowed by the RF network, and commands that are standardized and/or more widely used by devices from various manufacturers otherwise.

For example, the electric outlets devices from a manufacturer may be able to receive commands to control heating devices using the "fil pilote" protocol, that are not defined by the ZCL, while other electric outlet devices may receive only commands to turn the electricity ON/OFF, and therefore switch ON or OFF an electrical heater. Standard commands thus provide less flexibility and fewer options than custom commands. In addition, even a standard network may not allow all the commands defined in the standard. More generally, this example is applicable to commands to set through electrical signals a heating mode of a heating device, whether said commands to set the heating mode of the heating device comply with the "fil pilote" protocol or not.

The first device can thus send a standard Zigbee joining message to join a network, and add metadata indicating that it is a proprietary device, that it is able to send custom commands and/or that it seeks to join a proprietary network. Such metadata may indicate explicitly the commands that can be sent by the first device, or more simply indicate that the first device complies with a given MSP that allows the commands.

If the RF that is commissioned is a proprietary network, or a network that complies with a MSP, the metadata is interpreted, and the response message indicates that the RF network is a proprietary network, or a network that complies with a MSP. Otherwise a standard Zigbee response is sent, indicating that the network can be joined. If the network allows them, custom commands such as commands to configure electric outlets to send "fil pilote" commands are associated to the input types, while, otherwise, more restrictive commands, for example commands to turn electricity light ON or OFF are used. Therefore, this embodiment allows the first device 500 to send specific/non-standard commands when they are available, while preserving the compatibility with existing/standard networks, and the ability to send commands that are widely recognized.

In a number of embodiments of the invention, the communication link 510 is able to communicate using a plurality of frequencies. The frequencies may be either standard frequencies, such as the frequencies of the Zigbee channels defined by the IEEE 802.15.4 standard, and/or specific frequencies, for example frequencies defined by a manufacturer and used by the products sold by a manufacturer.

As explained above, a standard network allows a wide number of different commands, but a network using proprietary technologies may allow more specific commands. A network using proprietary technologies may thus use a specific radio frequency, and be completely adapted to the needs of the devices sold by the manufacturer. For example, in terms of communications, a network using proprietary technologies may define specific frame types, and allow specific commands. It is therefore desirable for the first device to be able to join networks operating at different radio frequencies, and adapt the commands sent to the network accordingly.

In order to solve this issue, the first device 500 can be provided with a communication link 510 to RF networks that is configured to operate using a plurality of radio frequencies. Furthermore, at least one radio frequency is associated to at least one corresponding RF network type that allows a corresponding set of commands. For example, a first frequency can be specific to a network type whose specifications are defined by the manufacturer of the first device, while a second frequency can be a Zigbee standard frequency. In the former case, commands specifically defined by the manufacturer, such as custom commands to configure an electric outlet to send "fil pilote" commands to an electric heater can be used, while, in the latter case, Zigbee standard commands, such as "switch ON electricity" or "switch OFF electricity" can be used.

The processing logic 521 is thus configured to use the communication link to send a message to join a RF network, at one of the radio frequencies, for example the first radio frequency. If the RF network belongs to the type of network using the first radio frequency, a message response will be received at the first radio frequency, and the processor 521 is configured to associate, to the input type of the input unit, an associated command that belongs to said corresponding set of commands. For example, if a response message is received at the first frequency, it is assumed that the network complies with the specification of the manufacturer. Therefore, specific commands, such as commands to configure electric outlets to send "fil pilote" commands can be associated to user inputs.

This advantageously allows a remote control to use different kinds of networks defined by different frequencies, that can be either standard or specific ones, operating at different frequencies, and adapt the commands sent by the remote control to the type of network encountered.

As noted above, in a number of embodiments of the invention, the first device may be able to send commands to different types of networks that allow different commands. For example, if the input unit 530 is a button with a number of discrete positions, a network type whose specifications are defined by the manufacturer of the first device may allow commands to configure electric outlets to send "fil pilote" commands, while some standard Zigbee networks allow commands to turn the electricity ON or OFF in electric outlets. In order for the first device to send commands that best use the capabilities of the input unit, it is therefore desirable for the first device 500 to enter in priority a network whose specifications are defined by the manufacturer and that allow commands to configure electric outlets to send "fil pilote" commands, and, if such network is not available, enter a standard network such as a Zigbee network using Zigbee public profiles that allows commands to switch the electricity ON or OFF.

In another example, a network that comprises a Wi-Fi Gateway may also allow a larger set of commands, because some commands can be routed from the LAN network to the Wi-Fi, and, if applicable, over the internet. This may for example allow establishing communications with a personal computing device of the user such as a smartphone or a tablet.

The same problem generally arises for different types of networks, and different types of commands: it is desirable for a first device to join in priority a network that allows certain commands, and, if such network is not available, other types of networks.

In a number of embodiments of the invention, the communication link 510 is able to send different joining messages that belong to different messages types, each message type corresponding to a network type. For example, the communication link 510 may be able to send messages to join RF networks at different frequencies, each frequency corresponding to a type of network. The message type may also be characterized by specific metadata within the joining message. More generally, any feature of a message to join a RF network that allows performing a joining operation to a specific type of RF network can be used.

In a number of embodiments of the invention, the processor 521 is configured to iteratively:
- use 610b the communication link to send a message to join the RF network, said message belonging to a join message type;
- verify 611b if a response message is received to acknowledge that the first device can join the RF network;
- if no response message is received, change the join message type 612b.

Then, a new iteration is performed with the new join message, which corresponds to a different network type. Such iterations can be performed until a RF is joined, or each possible join message type has been tried, without success.

As stated above, when a network is joined, the commands that can be sent by the first device over the network are adapted according to the commands allowed by the network type to which the network belongs.

Thus, the first device can join different types of network in a defined priority order, by first trying to join a network that belongs to a network type with a higher priority, then networks that belong to network types with a lower priority.

The priorities to join RF networks can be defined according to different rules. For example, the first device may seek to join, in a predefined order, a network that belongs to a type of networks that allow the largest set of commands, then networks that allow less commands. Alternatively, the first device may be configured to try first to join a network that allows certain specific commands, for example a command to configure an electric outlet to send "fil pilote" commands and, if such network is not available, networks that allow other commands, such as commands to switch the electricity ON or OFF. Any rule that allows a first device to join networks according to a priority order which is based on the commands that are allowed by the network can be used in the course of the invention.

In a number of embodiments of the invention, the type of a RF network, and protocol used by a RF network may change as a function of a type of device. For example, a RF network which is based on the Zigbee protocol may use a proprietary or custom protocol (or MSP), if only devices from the same manufacturer, that all use the proprietary protocol are present in the RF network. Conversely, a standard protocol, such as one of the public profiles defined by the Zigbee 3.0 standard may be used, if at least one device that does not use the proprietary protocol is present in the RF network. That allows dynamically using a proprietary protocol with an extended set of commands, or a standard protocol, depending on the devices that are present in the network.

In a number of embodiments of the invention, the first device is configured to dynamically adapt the commands that are sent upon an input of the user, depending on the evolutions of the type of RF network and/or protocol used by the RF network.

In order to do so, when the commands allowed by a network change, the first device receives a message indicating that the commands allowed by the network have changed. Any message, from which the commands accepted by the network can be deduced, may be used according to various embodiments of the invention. For example, the messages below may be used:
- a message that explicitly defines a list of the commands that can be used in the network;
- a message that indicates the type of network of protocol the network has switched into. For example, a message may indicate that the protocol used by the network has switched to a protocol such as Zigbee 2.0, Zigbee 3.0, or a proprietary protocol defined by the manufacturer of the first device.

As will be explained in more details with reference to the FIGS. 7a to 7c, a number of different situations may occur, that can trigger a change of the protocol used by the RF network. As each type of protocol allows different types of commands, such a change modifies the commands that can be sent over the network. For example, some commands that were initially allowed may not be allowed anymore upon a change of protocol, while new commands, that were not initially allowed, may be added.

In order to automatically adapt the commands sent in response to a change of the protocol used by the RF network, the processor 521 is configured, upon the reception 621b of a message indicating a change of the commands allowed by the network, to:
- update 631b the command associated with the input type to an updated command;
- upon an input 641b of said input type from the user, use 651b the communication link to send to the RF network a message with said updated command.

For example, if the input unit 530 is a button with a number of discrete positions, and the protocol used by the RF network may be either a proprietary protocol whose specifications are defined by the manufacturer of the first device comprising commands to configure an electric outlet to send "fil pilote" commands, or a Zigbee 3.0 protocol that allows commands to switch the electricity ON or OFF:
- when the protocol used by the RF network switches from Zigbee 3.0 to the proprietary protocol, commands to configure an electric outlet to send "fil pilote" commands can be activated;
- when the protocol used by the RF network switches from the proprietary protocol to the Zigbee 3.0 protocol, commands to send "fil pilote" commands can be deactivated, and commands to switch electricity ON or OFF activated.

More generally, this example is applicable to send commands to configure electric outlets to send through electrical signals commands to set a heating mode of a heating device, whether said commands to set the heating mode of the heating device comply with the "fil pilote" protocol or not.

The invention is not restricted to this example, and could be applied to any type of protocol or RF network type, that is characterized by the commands sent. For example, the embodiments discussed with respect to FIG. 6b can be applied different standard protocols, such as Zigbee 2.0 and Zigbee 3.0, different proprietary protocols, or a combination thereof.

Therefore, the first device is always configured to send the commands which are the most appropriate depending on the current type of RF network or protocol, and to automatically adapt the commands sent upon an input of the user according to a change of the type of RF network or type of protocol, without modifying the user experience.

Another option to update the functionalities of the network when the topology of the network changes, is to open the network. The action of opening the network consists in sending a notification to the devices of the network, that the network configuration changes. In this case, each device tries to re-enter a network. When the commands allowed by a network have changed, the device of the invention re-adapts the commands using the principles explained above. If a plurality of networks is available, the device of the invention can select a network to enter based on the principles explained above, for example by selecting a network that allows preferred commands.

FIG. 6c represents a flow chart of a binding procedure of a device in a number of embodiments of the invention.

The first device 500 and at least a second device have joined a RF network. The first device 500 can then perform a binding with a second device in the RF network.

According to various embodiments of the invention, the binding can be triggered in different ways. For example, European patent application n° 16306793.7 filed by the same applicant discloses devices which are configured to perform the binding when a second predefined event occurs.

In a number of embodiments of the invention, the second predefined event is a "tap-tap" of the first device on the second device that is detected by an accelerometer in the second device and, in a variant, also in the first device. As discussed above, the "tap-tap" is a synchronized shock that occurs when a quick double tap is performed between two devices. This event or in the variant with an accelerometer in each device the combination of the detections by the two accelerometers, trigger(s) the transmission of the binding request from the first device to the second device. In the latter variant, instead of a shock of one device on the other, the triggering event may be an occurrence within a predefined timeframe of a first shock on one device and a second shock on the other device. As a variant, instead of a detection of a shock or a contact by one or more accelerometers, binding may occur on detection of proximity by a proximity sensor. In another variant, binding may be triggered on detection of a concomitant change in position of the two devices or of a match of positions of the two devices. Accelerometers may be supplemented by gyrometers and/or magnetometers to measure position and/or orientation of the two devices in a 3D Cartesian frame of reference. With such a sensor arrangement a large number of signatures of the devices will be possible to implement as a way to perform the binding.

In a number of other embodiments, the second predefined event may be a validation by a SEC (second device) of a binding request sent by the RC (first device) using a pair-to-pair communication protocol on an electromagnetic carrier signal. The electromagnetic signal carrying the request may be an infrared carrier, a visible light carrier, an RFID carrier or an NFC carrier. In an embodiment, the signal may have a waveform that is proprietary and is an identifier per se. It may also be an encrypted identifier that is carried by the signal and decrypted at the receiving node.

In a number of variants where the triggering event is an occurrence within a preset timeframe of a plurality of shocks on two or more devices, a validation may be implemented whereby binding is only possible with devices that are within a predefined range. The condition may be verified for instance by a measurement of the Received Signal Strength Indication (RSSI).

In embodiments of the invention that are implemented purely based on the use of the Zigbee Cluster Library (ZCL), on a binding procedure according to the Zigbee standard, a device that sends a binding request will receive responses from the ZDOs of the network that will list the functionalities (or clusters) that these ZDOs are configured to perform. A library of clusters (Zigbee Cluster Library or ZCL) has been defined by the Zigbee Alliance to cover a number of functionalities for specific applications (Smart Energy, Home Automation, Zigbee Light Link, etc.). A cluster has a server end and a client end, i.e. the server ZDOs are configured to receive commands while the client ZDOs are configured to send commands. The clusters are embedded in the processing logic or memory of the ZDOs. The binding request comprises the list of clusters of the requesting ZDO and their mode (server/client); the receiving ZDOs check if their own configuration can map onto the configuration of the requesting ZDO (i.e. the receiving ZDO is able to implement at least one cluster in a complementary manner—server/client). This procedure defines a list of possible ZDOs to be bound to the requesting ZDO. All the possible ZDOs may be bound or a selection may be made (possibly based on the RSSI). The network addresses of the bound ZDOs are stored in a memory of all the ZDOs.

When the first device performs a binding request to a second device, it does not have a priori knowledge of the commands that may be received by the second device. However, the second device may be configured to receive very different commands.

For example, devices may have different purposes. For example, a lighting device will be able to receive commands such as switch ON/switch OFF the light, while a shutter may be able to receive commands such as "open" or "close". The second device may also receive different commands, because it implements different level of functionalities. For example, a lighting device which is only able to light or not may receive only commands to switch ON/switch OFF the light, while a lighting device which is able to light according to different levels of intensity of light may receive commands to set an intensity of light, for example from 0% to 100%. It is therefore desirable, for a remote control, to adapt, when binding to a second device, its commands to the commands that may be received by the second device, without further input by a user.

In order to do so, the processor 521 is configured to:
- use the communication link to send 610c a binding request to the second device in the RF network;
- use the communication link to receive 620c a response message from the second device, said response message indicating commands that can be sent by the first device to the second device;
- associate 630c, to an input type of the input unit, an associated command of said plurality of commands that is allowed by the second device;
- upon an input of said input type from the user 640c, use the communication link to send 650c to the second device a message with said associated command.

Thus, the first device can adapt the commands that are sent to the device with which it is binding. For example, if the first device is a remote control with a button switch:
- if the second device is a lamp, and the response message indicates that it accepts "switch ON light" and "switch OFF light" commands, the processor 521 can be configured to send a "switch ON light" command when the button switch is in a first position, and "switch OFF light" command when the button switch is in a second position;
- if the second device is a shutter, and the response message indicates that it accepts "open shutter" and "close shutter" commands, the processor 521 can be configured to send an "open shutter" command when the button switch is in a first position and "close shutter command" command when the button switch is in a second position.

Therefore, a single remote control can serve a plurality of purposes. For example, a remote control with a switch button may serve to switch ON/OFF a light, or to open/close a shutter, without the user having to manually set the purpose of the device. The binding operation can be performed in an analogous way for all the target devices, for example by performing a "tap-tap" between the remote control and the target device. Such a remote control is thus very user-friendly, which only has to intuitively trigger a binding operation with a target device, in order for the remote control to become an effective remote control for the target device.

In another example, the first device is a remote control wherein a control button can take a plurality of discrete positions. For example, if the input unit 530 is a rotatable button or a button with a number of discrete positions:
- if the response message indicates that the allowed commands are "switch ON light" and "switch OFF light" commands, each position of the button may be associated with either a "switch ON light" and "switch OFF light" command (for example, the positions may ordered, and can be split into a first half associated with a "switch OFF light" command, and a second half associated with a "switch ON light" command), and upon an input of the user, a "switch ON light" or "switch OFF light" command may be sent depending on the position that is selected;
- if the response message indicates that the allowed commands are discrete commands of intensity of light, for example commands of an intensity of light from 0% to 100%, each position of the button may be associated with a percentage of intensity of light corresponding to its relative position among the discrete positions of the button, and, upon an input of the user, a command of an intensity of light may be sent depending on the discrete position that is selected.

These examples demonstrate the ability of the first device to adapt the sent commands to the second device it is bound to.

It shall however be noted that the invention is not restricted to these examples, and can be applied to a large number of different commands and functionalities. For example, the commands may be commands to activate/deactivate a fan, open close a window, set the level of openness of a shutter, set the temperature of an oven, etc. . . . . More generally, any command that can be sent to an object may be used by the invention.

According to various embodiments of the invention, different methods exist to send a binding request to the second device, and identify commands that can be used based on a response message.

For example, the response message may define the commands that can be sent to the second device using a standard library. For example, it can contain the clusters of the ZCL that the second device complies with.

As explained above, standard commands such as those of the ZCL may lack some functionality that can be specifically implemented by the devices of a manufacturer. In order for the first device to send such specific commands, a custom binding request can be sent, and a custom response message received.

However, it may be advantageous to send a binding request that allows the first device to send manufacturer-specific commands if the second device allows such commands, and standard commands otherwise. For example, when binding to a lighting device, it may be advantageous to send binding requests that allow response messages indicating that the second device allows either manufacturer-specific commands, or standard commands.

In order to do so, the binding request may contain, in addition to the standard binding request, metadata indicating that the first device is able to send manufacturer-specific commands. If the second device is able to receive manufacturer-specific commands, a specific response message can be sent. Otherwise, a standard response message, for example a message indicating the ZCL clusters that are accepted by the second device, is sent. The commands sent by the first device can be adapted accordingly.

Taking as example a remote control wherein a control button can take a plurality of discrete positions, it may be advantageous, when binding to an electric outlet to which an electric heater is plugged, to send commands to configure the electric outlet to send "fil pilote" commands to the heater if these commands are supported by the electric outlet (this may for example be the case if the electric outlet is from the same manufacturer than the first device), and commands to switch ON or OFF the electricity otherwise, if the device complies with the ZCL. It shall be noted that this example also applies to devices that accept other types of commands, for example commands to set an intensity of light if there exist both standard and custom commands of the same type.

The first device can send a binding request to a lighting device, for example when the user performs a "tap-tap" to the lighting device that comprises a standard Zigbee binding request, and private metadata that comprise information indicating that it is able to send additional commands not defined by the ZCL, such as commands to configure an electric outlet to send "fil pilote" commands to an electric heater.

Upon reception of the binding request, an electric outlet device that is able to decode the metadata sends a response message indicating that it accepts additional commands not defined by the ZCL, such as commands to send "fil pilote" commands to an electric heater. The processor 521 then configures the first device to send commands to configure the electric outlet to send "fil pilote" commands to the electric heater upon an input of the user in any of the discrete positions of the control button.

Otherwise, if the electric outlet is not able to decode the metadata, for example because it complies only with the ZCL, because it is not designed by the same manufacturer, or because it is a legacy product, the electric outlet sends back a standard response message comprising the ZCL clusters accepted. In the case of an electric outlet device, the ZCL clusters will typically be clusters to switch ON or OFF the electricity. The processor 521 therefore, upon reception of such a response message, configures the first device to send commands to switch the electricity ON or OFF upon an input of the user on the remote control button.

The first device is thus able to bind to a second device, while having both the flexibility to send specific or tailored commands if the second device accepts them, and commands defined by a standard, in order to preserve the compatibility of the first device with any device complying with a standard. Moreover, the user experience is not modified depending on the device the first device is bound to. Indeed, the way the binding requests are performed remain the same, and the user does not have to manually indicate that standard or specific commands shall be used.

Figure 7A:
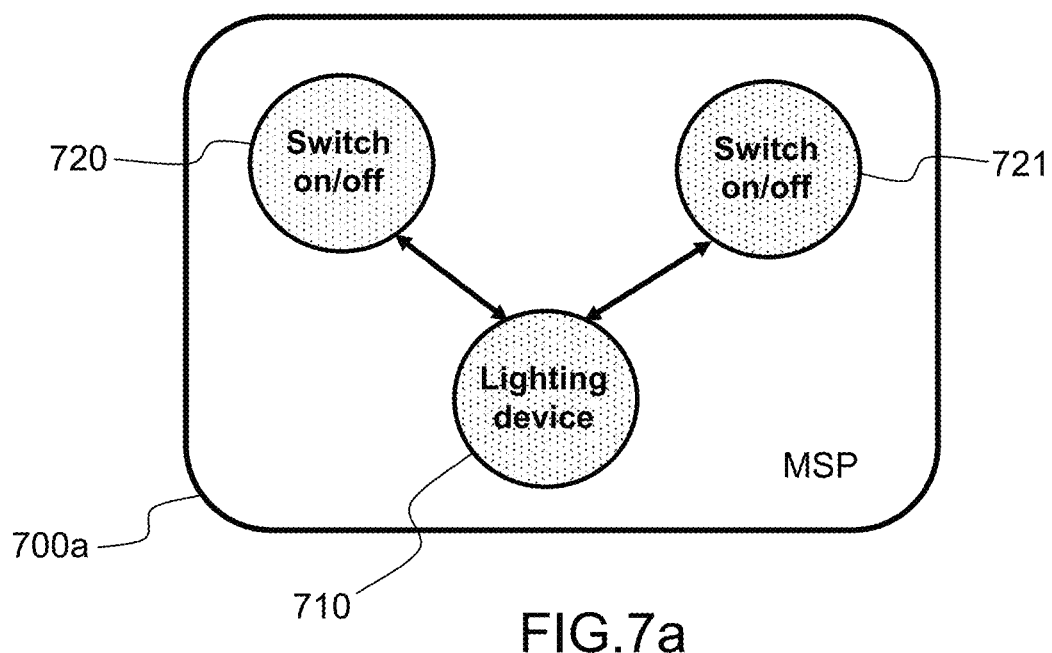
FIGS. 7*a*, 7*b* and 7*c* represent three configurations of a network in a number of embodiments of the invention.
Figure 7B:
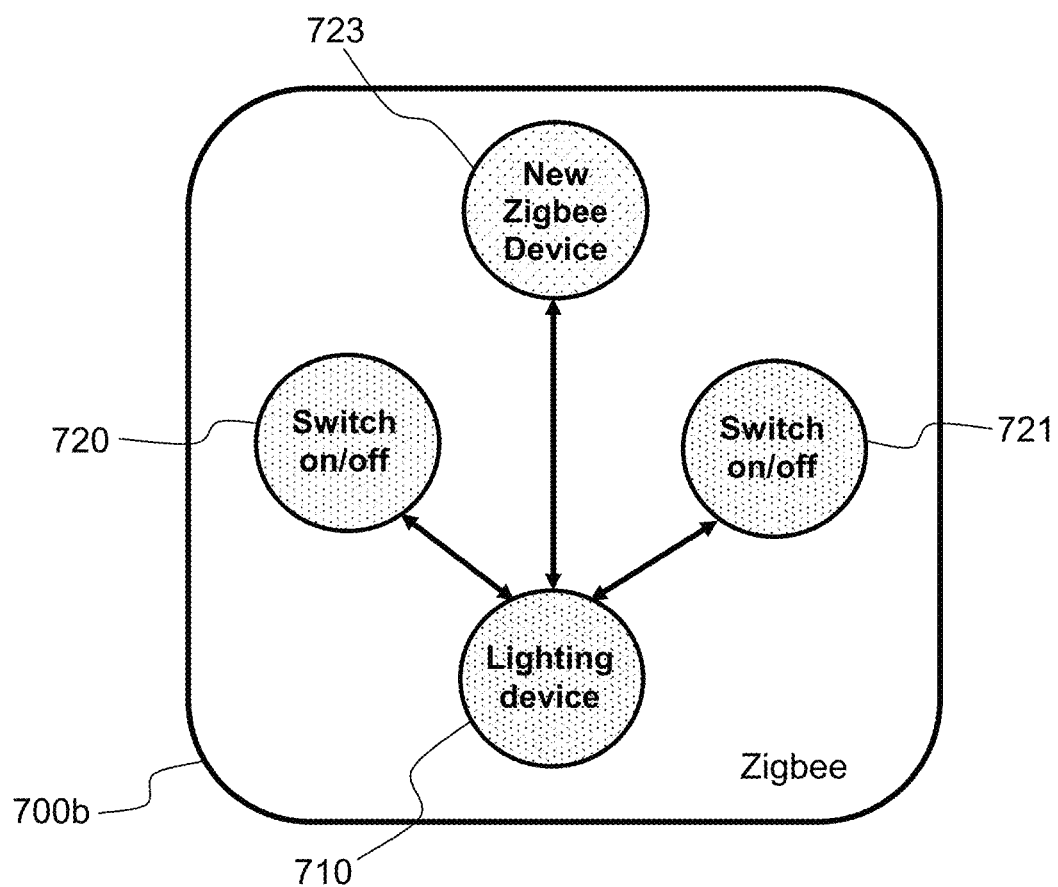
Figure 7C:
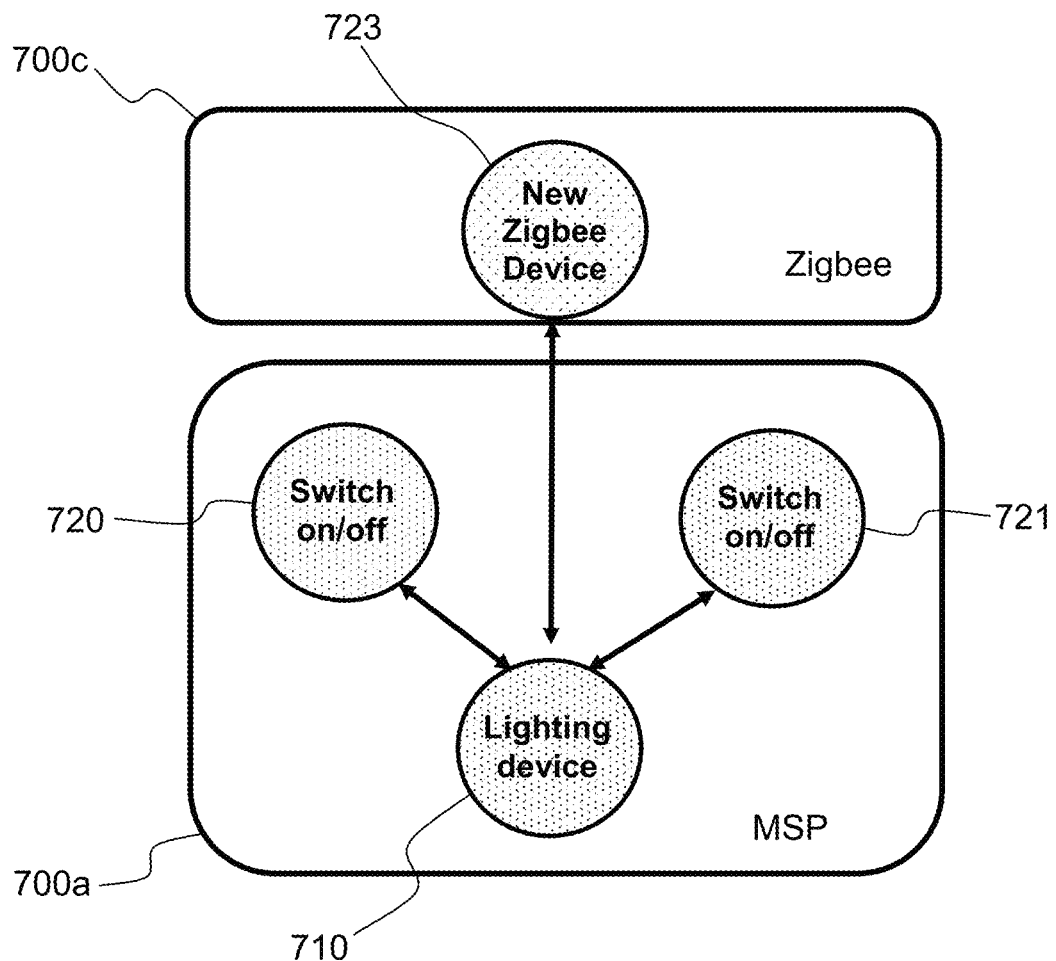

FIGS. 7a, 7b and 7c represent three configurations of a network in a number of embodiments of the invention.

As noted above, a device of the invention may, in a number of embodiments of the invention, be able to connect to various types of networks. For example, it may be able to connect to both networks that comply with an interoperable standard, and networks that relies on protocols specific to a manufacturer For example, a protocol specific to a manufacturer may be an extension of a standard protocol such as Zigbee with additional commands and/or features.

In the example of FIG. 7a, a network 700a is in place, which uses a protocol specific to a manufacturer. The network 700a comprises two switches 720 and 721, and a lighting device 710 which serves as a coordinator for the network. Since the network is based on a protocol specific to a manufacturer, it cannot be joined by devices from a different manufacturer. For example, if the network 700a is a Zigbee network, it can use an MSP (Manufacturer Specific Profile) that allows a manufacturer to provide additional functionalities to the Zigbee 3.0 standard, such as additional clusters, joining and binding protocols.

In the example of FIG. 7b, a device 723 that complies with the Zigbee 3.0 standard, but not with the MSP used by the devices 710, 720 and 721 joins the network to obtain the network 700b. Since the device 723 is not able to use the same MSP than the devices 710, 720 and 721, the lighting device 710, which serves as a coordinator, sends a message to the devices 720 and 721 to switch to a Zigbee public profile. The devices 720 and 721 thus switch to a Zigbee public profile, and configure themselves to send, upon inputs of a user, commands defined by the standard Zigbee clusters, rather than manufacturer-specific clusters. As noted above, the switch between different types of network can also be performed by opening the networks. Then each device 720, 721 tries to re-enter a network, and associate commands to input types depending on the commands that are allowed by the updated network.

In the example of FIG. 7c, when the device 723 performs a joining request, the lighting device creates, in addition to the network 700a, an additional network 700c with the device 723. This allows the device 720, 721 and 710 to keep using the MSP within the network 700a, while communicating using a Zigbee public profile with the device 723.

These examples illustrate the ability of the invention to adapt to different types of network and protocols and to allow the user to send commands to devices in a network, which are automatically adapted to the devices within the network.

The examples described above are given as non-limitative illustrations of embodiments of the invention. It shall be noted that, even if the description has generally focused on Zigbee network, the invention can be applied to other RF networks.

They do not in any way limit the scope of the invention which is defined by the following claims. Moreover, all non-exclusive embodiments discussed above can be combined.

The invention claimed is:

1. A first device comprising:
   a communication link to a RF network compliant with a communication standard;
   a processor;
   an input unit to receive inputs from a user;
   a memory storing a table of data representative of a plurality of commands to send to the RF network comprising a first set of commands belonging to said communication standard and a second set of commands not belonging to said communication standard;
   the processor being configured to:
      use the communication link to send to a second device in the RF network a message compliant with said communication standard to join the RF network, said message to join the RF network comprising optional metadata;
      use the communication link to receive a response message from the second device, said response message comprising, if commands from the second set of commands are allowed by the RF network, optional response metadata;
      associate, based on said response metadata, to an input type of the input unit, a command from the second set of commands if the commands from the second set of commands are allowed by the RF network and a command from the first set of commands otherwise;
      upon an input of said input type from the user, use the communication link to send to the RF network a message with said associated command.

2. The first device of claim 1 wherein the processor is configured to iteratively:

use the communication link to send a message to join the RF network, said message belonging to a join message type;

verify if a response message is received to acknowledge that the first device can join the RF network;

if no response message is received, change the join message type.

3. The first device of claim 1, wherein the processor is configured, upon the reception of a message indicating a change of the commands allowed by the network, to:

update the command associated with the input type to an updated command;

upon an input of said input type from the user, use the communication link to send to the RF network a message with said updated command.

4. The first device of one of claim 1, wherein:

the input unit is a rotatable button or a button with a number of discrete positions;

the processor is configured:

if the first set of commands comprises "switch ON light" and "switch OFF light" commands, associate to each position of the button a "switch ON light" or a "switch OFF light" command;

if the second set of commands comprises commands of intensity of light, associate to each position of the button a percentage of intensity of light corresponding to its relative position among the discrete positions of the button.

5. The first device of claim 1, wherein:

the RF network comprises one or more electric outlets;

one or more electric heaters are plugged respectively into said one or more electric outlets;

the input unit is a rotatable button or a button with a number of discrete positions;

the processor is configured:

if the response message indicates that the allowed commands are "switch electricity ON" and "switch electricity OFF" commands, to control said one or more electric outlets, associate to each position of the button a "switch electricity ON" or a "switch electricity OFF" command;

if the response message indicates that the allowed commands are commands to configure said one or more electric outlets to send respectively to said one or more electric heaters commands to set a heating mode through an electric signal, associate to each position of the button a command to configure said one or more electric outlet to send respectively to said one or more electric heaters a command to set a heating mode through an electric signal.

6. The first device of claim 5, wherein said commands to set a heating mode through an electric signal complying with the "fil pilote" protocol of the NFC 15-100 standard.

7. A method comprising:

accessing a memory storing a table of data representative of a plurality of commands to send to a RF network compliant with a communication standard, sad plurality of commands comprising a first set of commands belonging to said communication standard and a second set of commands not belonging to said communication standard;

using a communication link of a first device to a-the RF network-to send a message compliant with said communication standard to join the RF network, said message to join the RF network comprising optional metadata;

using the communication link to receive a response message from the second device, said response message comprising, if commands from the second set of commands are allowed by the RF network, optional response metada;

associating, based on said response metadata, to an input type of an input unit of the first device, a command from the second set of commands if the commands from the second set of commands are allowed by the RF network and a command from the first set of commands otherwise;

upon an input of said input type from the user, using the communication link to send to the RF network a message with said associated command.

8. A computer program product comprising computer code instructions stored on a non-transitory computer storage medium, wherein when the computer code instructions when executed by one or more processor, configured the one or more processor to:

access a memory storing a table of data representative of a plurality of commands to send to a RF network compliant with a communication standard, sad plurality of commands comprising a first set of commands belonging to said communication standard and a second set of commands not belonging to said communication standard;

use a communication link of a first device to the RF network to send a message compliant with said communication standard to join the RF network, said message to join the RF network comprising optional metadata;

use the communication link to receive a response message from the second device, said response message comprising, if commands from the second set of commands are allowed by the RF network, optional response metadata;

associate, based on said response metadata, to an input type of an input unit of the first device, a command from the second set of commands if the commands from the second set of commands are allowed by the RF network and a command from the first set of commands otherwise;

upon an input of said input type from the user, use the communication link to send to the RF network a message with said associated command.

* * * * *